United States Patent [19]

Shinskey

[11] Patent Number: 5,335,165
[45] Date of Patent: Aug. 2, 1994

[54] METHOD AND APPARATUS FOR ADAPTIVE DEADTIME PROCESS CONTROL

[75] Inventor: Francis G. Shinskey, Foxboro, Mass.

[73] Assignee: The Foxboro Company, Foxboro, Mass.

[21] Appl. No.: 889,473

[22] Filed: May 27, 1992

[51] Int. Cl.$^5$ .............................................. G05B 13/02
[52] U.S. Cl. ................................. 364/162; 364/148; 364/177
[58] Field of Search ............... 364/148, 153, 162, 572, 364/177

[56] References Cited

U.S. PATENT DOCUMENTS

| Re. 33,267 | 7/1990 | Kraus | 364/158 |
|---|---|---|---|
| 3,515,860 | 6/1970 | Fitzgerald et al. | 364/155 |
| 3,617,717 | 11/1971 | Smith | 364/156 |
| 3,671,725 | 6/1972 | Bakke | 364/159 |
| 3,786,242 | 1/1974 | Brooks | 364/159 |
| 3,867,712 | 2/1975 | Harthill et al. | 340/6 R |
| 3,876,872 | 4/1975 | Spitz | 364/154 |
| 3,961,234 | 6/1976 | Chambers et al. | 318/561 |
| 3,992,616 | 11/1976 | Acker | 235/156 |
| 3,995,478 | 12/1976 | Wilhelm, Jr. | 364/153 |
| 4,186,384 | 1/1980 | Acker | 340/347 |
| 4,346,433 | 8/1982 | Rutledge | 364/162 |
| 4,441,151 | 4/1984 | Hayashibe | 364/157 |
| 4,602,326 | 7/1986 | Kraus | 364/158 |
| 4,654,811 | 3/1987 | Jakubzick | 364/572 |
| 4,855,897 | 8/1989 | Shinskey | 364/148 |
| 4,903,192 | 2/1990 | Saito et al. | 364/157 |
| 4,959,767 | 9/1990 | Buchner et al. | 364/157 |
| 5,091,844 | 2/1992 | Waltz | 364/153 |
| 5,124,626 | 6/1992 | Thoen | 318/610 |
| 5,191,521 | 3/1993 | Brosilow | 364/160 |

FOREIGN PATENT DOCUMENTS

| 0405924 | 6/1989 | European Pat. Off. | G06F 3/05 |
|---|---|---|---|
| 0377913 | 7/1990 | European Pat. Off. | |
| 932461 | 5/1982 | U.S.S.R. | G05B 15/00 |
| 1012202 | 4/1983 | U.S.S.R. | G05B 13/02 |

OTHER PUBLICATIONS

Shinskey, Process Control Systems, McGraw-Hill, 1988, pp. 150-157.
Ulery et al., "Software requirements for Statistical Quality Control," Instrument Society of America, 1986, pp. 821-828.
Badavas et al., "Principles of Statistical Quality Control . . . " The Foxboro Co., 1988, pp. 1-56.

(List continued on next page.)

*Primary Examiner*—Jerry Smith
*Assistant Examiner*—Paul Gordon
*Attorney, Agent, or Firm*—Lahive & Cockfield

[57] ABSTRACT

An adaptive PID$\tau_d$ controller has a proportional derivative section that generates an error signal representing an error in the control signal, particularly, as a function of (i) a time rate of change of the controlled variable signal and (ii) a difference between the controlled variable signal and a predetermined setpoint. A summation element sums that error signal with a time-delayed integral signal to generate a summation signal. That summation signal, in turn, is filtered by the aforementioned adaptive noise filter to generate a manipulated variable signal, which is selectively applied to the process by an output section. A feedback element processes the manipulated variable signal to generate the time-delayed integral signal, referred to above. That processing includes time-delaying the manipulated variable signal an mount substantially equal to the deadtime of the process, $\tau_d$, and passing that time-delayed manipulated variable signal through a first-order lag of time constant I to generate the time-delayed integral signal.

18 Claims, 5 Drawing Sheets

OTHER PUBLICATIONS

Badavas et al., "Statistical Process Control Embedded in Open Industrial Systems," ISA, 1988, pp. 1299–1310.

Epperly et al., "Statistical Process Control Integrated with Distributed Control Systems," Nat'l Petroleum Retainers Assoc., 1988, pp. 1–15.

MacGregor et al., "On Line Statistical Process Control," Chemical Engineering Progress, 1988, pp. 21–31.

Shinskey, "How Good are our Controllers in Absolute Performance and Robustness?" Measurement & Control, vol. 23, 1990, pp. 114–121.

Shinskey, "Putting Controllers to the Test," Chemical Engineering, 1990, pp. 96–106.

Shinskey, "Absolute Performance and Robustness Measures . . . " Proceedings: 46 Annual Symposium on Instrumentation . . . 1991, pp. 55–63.

Shinskey, "Model Predictors: The First Smart Controllers," I&CS 1991, pp. 49–52.

Shinskey, "Evaluating Feedback Controllers Challenges Users and Vendors," Control Engineering, 1991, pp. 75–78.

Shinskey, "Controlling Temperature in Batch Reactors," INTECH, 1992, pp. 69–72.

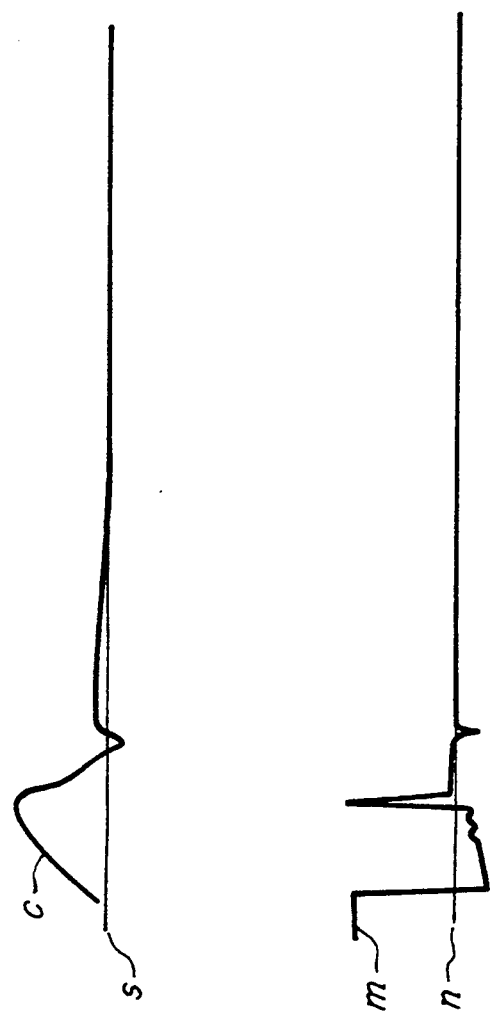

METHOD AND APPARATUS FOR ADAPTIVE DEADTIME PROCESS CONTROL

REFERENCE TO RELATED APPLICATIONS

This application is related to the following copending, commonly assigned applications, assigned to the assignee hereof and filed the same day herewith.

U.S. patent application Ser. No. 07/889,472, for METHOD AND APPARATUS FOR ANALYZING PROCESS CHARACTERISTICS, filed on May 27, 1992; and U.S. patent application Ser. No. 07/889,474, for METHOD AND APPARATUS FOR TUNING PROCESS CONTROL EQUIPMENT filed on May 27, 1992.

The teachings of the above-cited applications are incorporated herein by reference.

BACKGROUND OF THE INVENTION

The invention relates to process control and, more particularly, to improved deadtime process control apparatus and methods.

"Process control" refers to the control of the operational parameters of a process by monitoring one or more of its characteristics over time. It is used to ensure that the quality and efficiency of a process do not vary substantially during a single run or over the course of several runs. Process control has application in both the manufacturing and service sectors.

A process control unit, or "controller," typically operates by monitoring and comparing a process characteristic, the controlled variable, with a desired "setpoint" level to determine whether the process is operating within acceptable bounds. As the controlled variable begins to deviate, the controller manipulates one of the process inputs, the manipulated variable, to bring the process back to the desired level of activity.

For example, as shown in FIG. 1, a process controller can oversee a process in which fluid flows at a constant rate from a continuously refilled tank. The controller monitors the liquid level in the tank and, when necessary to prevent the tank from running dry or overflowing, adjusts an inlet valve to increase or restrict the inflow.

Among the controllers developed by the art are those in which the manipulated variable signal is generated as a predetermined mathematical function of the controlled variable. One such controller, illustrated in FIG. 2a, is the proportional-integral-derivative (PID) controller. There, the manipulated variable is generated as a function of the "error," that is, the difference between the controlled variable and the setpoint:

$$m = \frac{100}{P}\left(e + \frac{1}{I}\int e\,dt - D\frac{dc}{dt}\right)$$

where,
m is the manipulated variable;
e is the error;
P, I and D are constants

In addition, the art has developed model-based controllers which model, mathematically, the operation of the process. One such controller is the deadtime controller, which relies on a model of the process deadtime and lag to determine values for the manipulated variable.

Deadtime is the time it takes a change in the manipulated variable to be reflected by a change in the controlled variable. For example, in a paper making process, deadtime is the time it takes for a change in the bleaching agent added to the initial slurry to be detected by a photo sensor that measures the whiteness of the final product web.

Lag is the time, after the deadtime period, that it takes the controlled variable to move approximately 63% of its final value, following a step change in the manipulated variable.

A deadtime controller of the type referred to above is shown in FIG. 2b. It is constructed by adding a "deadtime element," i.e., a time delay, into the integral feedback loop of a PID controller. This controller is referred to by the mnemonic "PID$\tau_d$."

Prior art PID$\tau_d$ controllers have not proven entirely satisfactory when utilized to control deadtime-dominant processes, that is, processes whose output characteristics are primarily determined by deadtime (as opposed to lag).

It is, accordingly, an object of this invention to provide improved methods and apparatus for process control. More particularly, an object is to provide improved PID$\tau_d$ deadtime controllers.

Still another object is to provide a deadtime controller capable of accurately and efficiently controlling deadtime dominant processes.

These and other objects are evident in the description which follows.

SUMMARY OF THE INVENTION

These and other objects are attained by the invention which provides, in one aspect, a deadtime controller, based on a PID$\tau_d$ design, which incorporates an adaptive noise filter in the output path, upstream from the feedback to the integration section.

More particularly, the invention provides an adaptive PID$\tau_d$ controller having a proportional derivative section that generates an error signal representing an error in the control signal, particularly, as a function of (i) a time rate of change of the controlled variable signal and (ii) a difference between the controlled variable signal and a predetermined setpoint.

A summation element sums that error signal with a time-delayed integral signal to generate a summation signal. That summation signal, in turn, is filtered by the aforementioned adaptive noise filter to generate a manipulated variable signal, which is selectively applied to the process by an output section.

A feedback element processes the manipulated variable signal to generate the time-delayed integral signal, referred to above. That processing includes time-delaying the manipulated variable signal an amount substantially equal to the deadtime of the process, $\tau_d$, and passing that time-delayed manipulated variable signal through a first-order lag of time constant I to generate the time-delayed integral signal.

According to a further aspect of the invention, the adaptive noise filter varies the filter time constant to maintain the level of noise in the manipulated variable signal at a predetermined level. Particularly, that time constant can be generated in accord with the mathematical relation:

$$\tau_f = \tau_d/20 * \sigma_m/\sigma_{set}$$

where
- $\tau_f$ is the filter time constant;
- $\tau_d$ is the process deadtime;
- $\sigma_m$ is the noise level in the controlled variable signal; and
- $\sigma_{set}$ is predetermined noise level.

According to still another aspect of the invention, the filter time constant can be limited to a pre-selected range between 0 and $0.1*\tau_d$.

Still other aspects of the invention include methods for process control in accord with the operations described above.

BRIEF DESCRIPTION OF THE DRAWINGS

A better understanding of the invention may be attained by reference to the drawings, in which:

FIG. 6 depicts the control of a deadtime dominant process by an adaptive PID$\tau_d$ controller in accord with the invention.

DETAILED DESCRIPTION OF THE ILLUSTRATED EMBODIMENT

Figure 1:
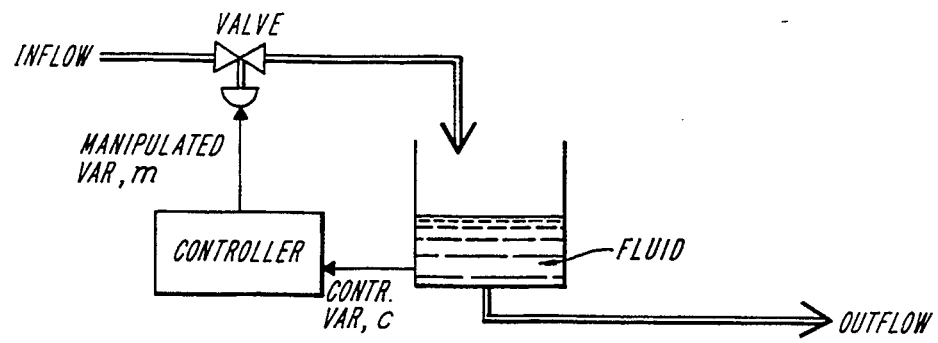
FIG. 1 depicts a fluid-flow process under control of a process controller.
Figure 2A:
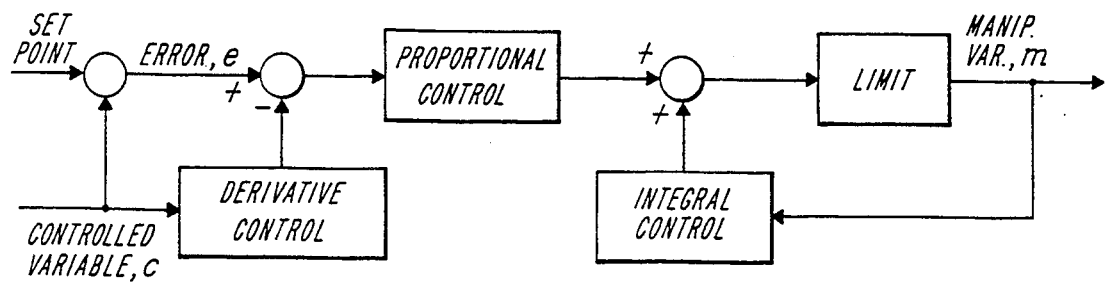
FIGS. 2a and 2b depict conventional PID and PID$\tau_d$ controllers.
Figure 2B:
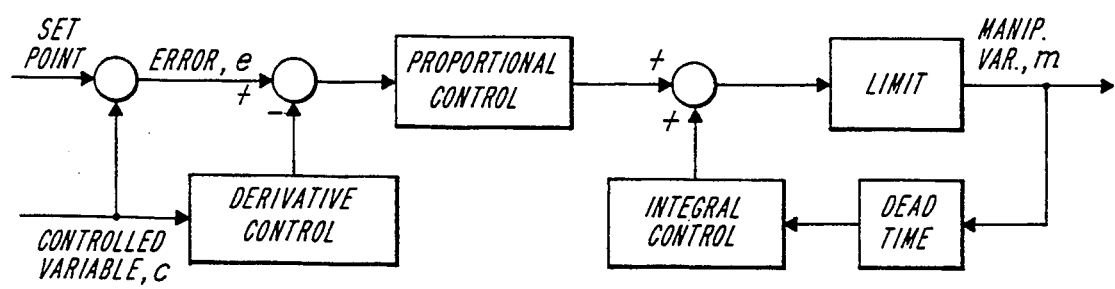
Figure 3:
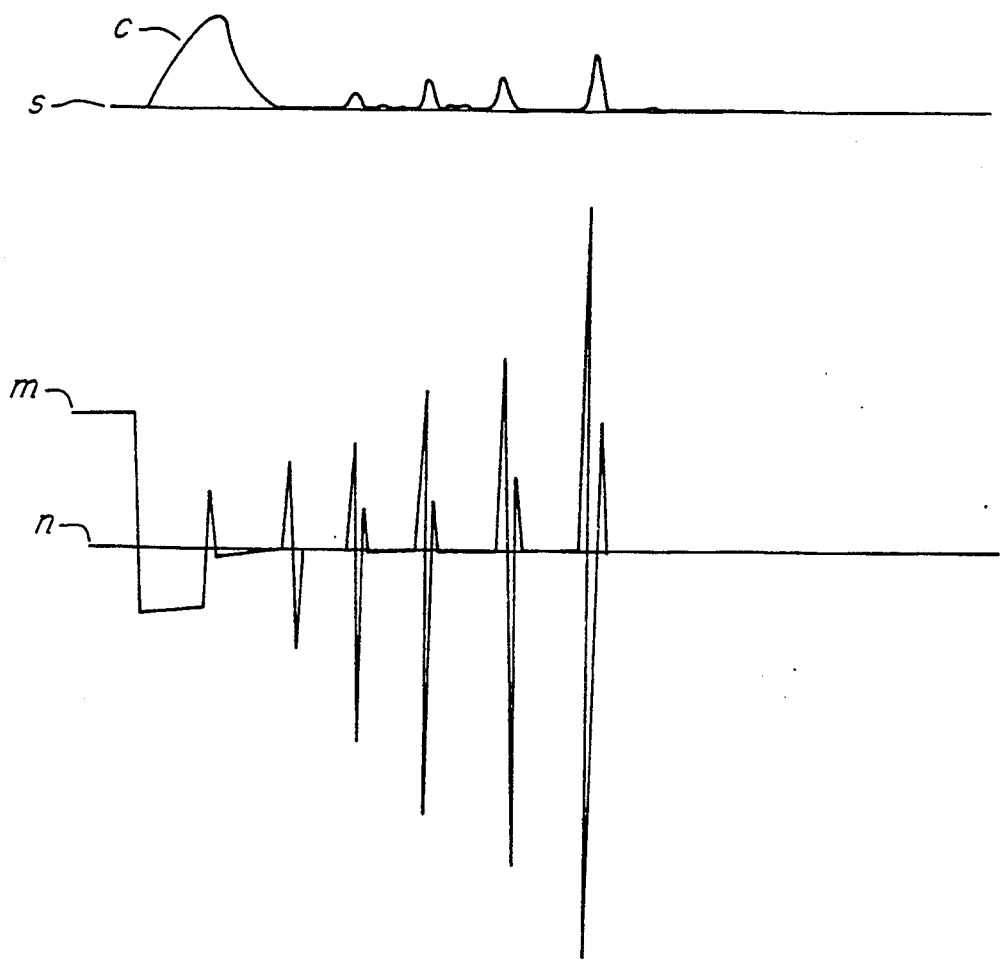
FIG. 3 depicts an effect of mismatch between the deadtime of a PID$\tau_d$ controller and that of the process in controls.

It has been discovered that prior art PID$\tau_d$ controllers, when not perfectly tuned to the processes they control, generate a manipulated variable signal with a pattern of high-frequency pulses. FIG. 3 illustrates this phenomenon, as particularly reflected when the deadtime of the controller is greater than that of a first-order deadtime dominant process that it controls.

Referring to the drawing, the controlled variable, c, experiences an initial rapid increase of value in response to an applied step load (not shown) on the process. As the controller compensates for the disturbance, the controlled variable converges toward the setpoint, s, which is represented by the horizontal axis.

The controller output, represented by manipulated variable signal, m, responds to the initial change in the controlled variable by rapidly decreasing in value. As the controlled variable begins returning toward the setpoint, the manipulated variable, too, returns to its normal value, n. Because of the mismatch between the deadtime constants of the process and controller, however, the manipulated variable signal begins to spike at each transition. These spikes, which increase in magnitude, effect changes in the process itself, as reflected in spiking of the controlled variable signal.

Figure 4:
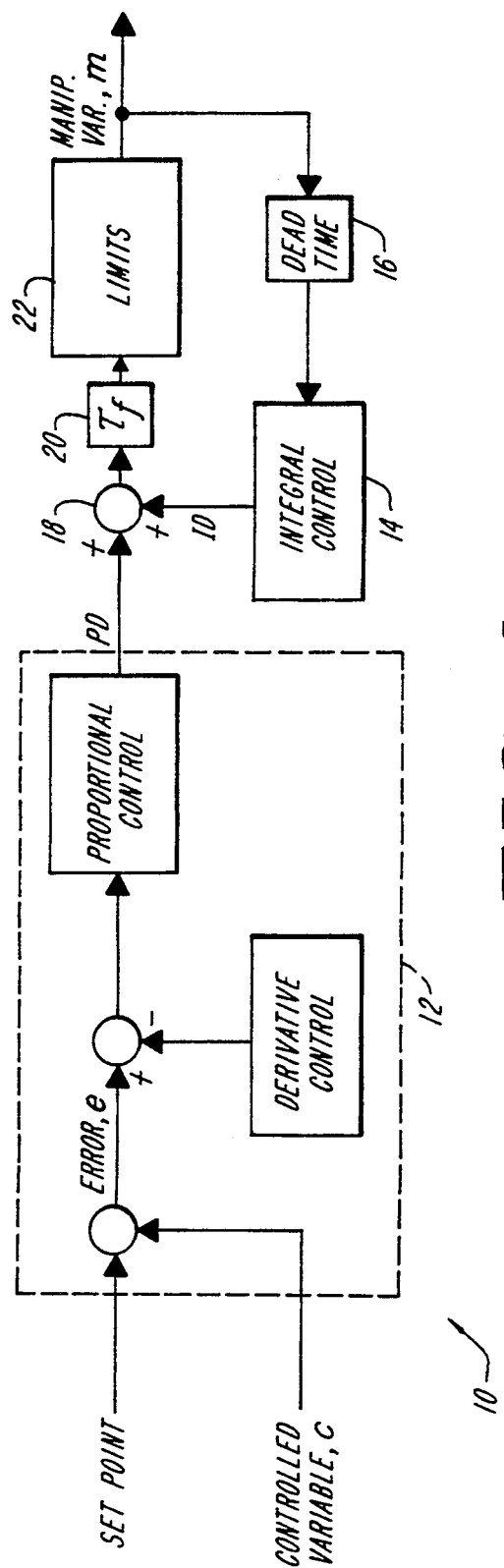
FIG. 4 depicts an adaptive PID$\tau_d$ controller constructed in a with the invention.

FIG. 4 depicts an adaptive PID$\tau_d$ controller according to the invention. Aspects of the controller 10 are constructed and operated in accord with a conventional PID$\tau_d$ controller, as particularly modified in accord with the discussion which follows.

The controller 10 includes a proportional-derivative section 12 that accepts as inputs the controlled variable signal, c, and a desired setpoint. The controlled variable signal, c, can be generated in a manner conventional to the art, for example, by measuring equipment coupled with the process itself. The setpoint, too, can be generated in a conventional manner, e.g., via the operator at a console (not shown).

The proportional-derivative section 12 operates in a manner like that of the corresponding section of a conventional PID$\tau_d$ controller. The section 12 generates a PD signal representative of an error in the controlled variable signal, c, particularly, as a function of a time rate of change of the controlled variable and a difference between it and the setpoint.

The gain of proportional-derivative section 12 can be set in a conventional manner. Preferably, however, the gain of that section 12 (and, accordingly, that of the illustrated controller 10) is set in accord with the teachings of related application U.S. patent application Ser. No. 07/889,474, for METHOD AND APPARATUS FOR TUNING PROCESS CONTROL EQUIPMENT filed on May 27, 1992.

Illustrated integral control element 14 and deadtime element 16, together, generate a signal, ID, representing a time-wise integral of a time delayed form of the manipulated variable signal, m. These elements, too, operate in a manner like that of the corresponding elements of a conventional PID$\tau_d$ controller. More particularly, the deadtime section 16 time-delays the manipulated variable signal, m, by the controller deadtime $\tau_d$. The integral control section, 14, integrates that time-delayed signal with a time constant I.

A summation section 18 sums the PD signal generated by the PD section 12 with the ID signal generated by the integral control 14.

The output of element 18 is passed through filter 20, having a time constant $\tau_f$, which attenuates high frequency components of the summed signal.

The filtered signal can be passed through high and low limits 22, which limits the filtered signal to limit integral windup.

The signal output by filter 20, and optionally limited by limiter unit 22, is applied to the process as manipulated variable signal m. That signal is fed back to the integral control and deadtime elements 14, 16, as illustrated, for production of the signal ID.

The controller 10 automatically adjusts the filter time constant $\tau_f$ to maintain the level of noise, ($\sigma_m$, in the manipulated variable signal at a predetermined level, $\sigma_{set}$.

Figure 5:
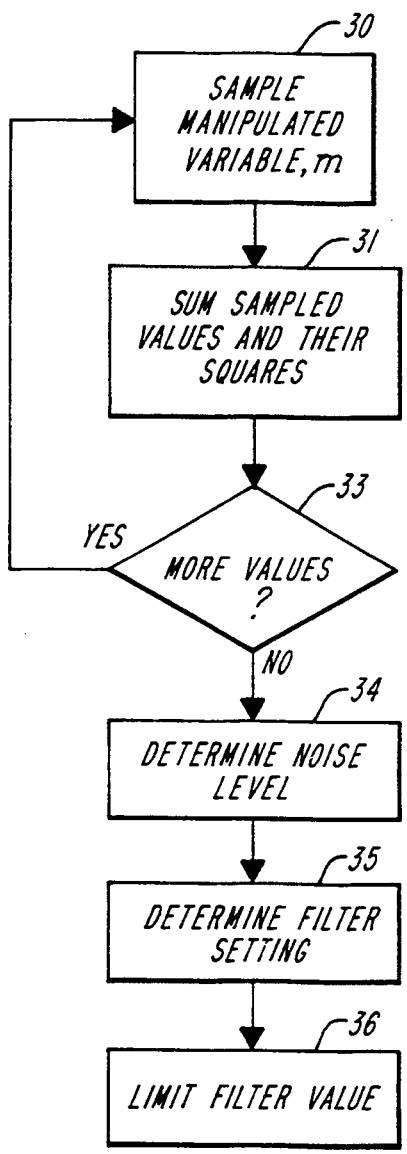
FIG. 5 depicts a preferred sequence for filter adaption in a PID$\tau_d$ controller constructed in accord with the invention.

A procedure for adjusting $\tau_f$ is shown in FIG. 5. There, in step 30, the controller 10 samples values of manipulated variable signal, m. In step 31, the controller sums values of m, as well as squares of those values. In step 33, the controller determines whether to sample more output values, preferably, so as to obtain a full set of samples over the period of a complete controller deadtime $\tau_d$.

Following sampling and summing steps 30–33, the controller determines the noise level of the manipulated variable signal; see step 34. Preferably, this is determined in accord with the mathematical relation:

$$\sigma m = \frac{\sqrt{n \cdot \Sigma(m^2) - (\Sigma m)^2}}{n \cdot (n-1)}$$

where,
- n is the number of sampled manipulated variable values;

$(\Sigma m)^2$ is the square of the sum of the sampled values; and $\Sigma(m^2)$ is the sum of squared sampled values.

In step 35, the controller determines the filter time constant in accord with the mathematical relation:

$$\tau_f = \tau_d/20 * \sigma_m/\sigma_{set}$$

where, $\sigma_{set}$ is predetermined noise level.

In step 36, the controller limits the value of the filter time constant, $\tau_f$, between the values 0 and $0.1*\tau_d$.

Those skilled in the art will appreciate that the aforementioned sequence of steps for determining the filter time constant, $\tau_f$, can be implemented in special purpose hardware. Preferably, those steps are implemented in software for execution, e.g., on a general purpose microprocessor. In this regard, it will be appreciated that such implementation can be achieved using conventional programing techniques as particularly adapted in accord with the teachings herein to provide the disclosed structure, signaling and functionality.

FIG. 6 illustrates the operation of an adaptive PID$\tau_d$ controller according to the invention in controlling a first-order deadtime dominant process. As in FIG. 3, the controller deadtime is initially greater than that of the process.

The initial response of the controller of FIG. 6 mirrors that shown in FIG. 3. However, because the controller adapts the filter time constant $\tau_f$ in the manner described above, spiking in the manipulated variable is prevented. Consequently, spiking in the process output, i.e., the controlled variable signal, is also prevented.

The foregoing describes improved deadtime process control apparatus and methods. These apparatus and methods improve on the techniques provided in the art by permitting better control of deadtime dominant processes.

Those skilled in the art will appreciate that the illustrated embodiment of the invention are exemplary, and that other embodiments incorporating additions and modifications to that described above fall within the scope of the invention. Thus, for example, the level of noise in the manipulated variable signal can be determined by processes other than that described above.

In view of the foregoing, what I claim is:

1. A method for controlling a process that has a characteristic that can be measured by a controlled variable signal and that responds to a manipulated variable signal for varying that characteristic, said method comprising:
   A. generating an PD signal indicative of an error in said controlled variable signal, said generating step including determining said PD signal as a function of a time rate of change of said controlled variable signal and a difference between said controlled variable signal and a predetermined setpoint,
   B. summing said PD signal and a time-delayed integral signal to generate a summation signal,
   C. filtering said summation signal, with a filter time constant $\tau_f$ to generate a manipulated variable signal,
   D. selectively applying said manipulated variable signal to said process, and
   E. feeding-back said manipulated variable signal to generate said time-delayed integral signal, said feed-back step including
      i) time-delaying said manipulated variable signal an amount substantially equal to a deadtime, $\tau_d$, and
      ii) passing that time-delayed manipulated variable signal through a first-order lag of time constant I to generate said time-delayed integral signal.

2. A method according to claim 1, wherein said filtering step comprises
   A. sampling noise in said manipulated variable signal to generate a signal, $\sigma_m$, representative of a level thereof, and
   B. varying said filter time constant $\tau_f$ to maintain said noise at a selected level, $\sigma_{set}$.

3. A method according to claim 2, wherein said filtering step includes generating said noise level signal, $\sigma_m$, as a function of noise value sampled over a time period substantially equal to said deadtime constant $\tau_d$.

4. A method according to claim 2, wherein said filtering step comprises an adaptation step for generating said filter time constant $\tau_f$ as a function of said deadtime constant $\tau_d$ and a ratio of said noise level $\sigma_m$ to said setpoint $\sigma_{set}$.

5. A method according to claim 4, wherein said filtering step comprises generating said noise level signal, $\sigma_m$, as a function of (i) a sum of sampled values of said noise and (ii) a sum of squares of those sampled values of said noise.

6. A method according to claim 5, wherein said adaptation step includes generating said filter time constant $\tau_f$ as a function of a mathematical relation $$\tau_f = \tau_d/20 * \sigma_m/\sigma_{set}.$$

7. A method according to any of claims 4 or 6, wherein said adaptation step includes limiting said filter time constant $\tau_f$ to a selected range of values.

8. A method according to claim 7, wherein said adaptation step includes limiting said filter time constant $\tau_f$ to values substantially between 0 and $0.1*\tau_d$.

9. A proportional-integral-derivative deadtime process controller for measuring a controlled variable signal representative of a first characteristic of a process, and for applying a manipulated variable signal to that process to vary that first characteristic, said controller comprising
   A. proportional derivative means for generating an PD signal indicative of an error in said controlled variable signal, said proportional derivative means including means for generating said PD signal as a function of a time rate of change of said controlled variable signal and a difference between said controlled variable signal and a predetermined setpoint,
   B. summation means, coupled with said proportional derivative means, for summing said PD signal and a time-delayed integral signal to generate a summation signal,
   C. noise filter means, coupled with said summation means, for filtering said summation signal to generate a manipulated variable signal, said noise filter means having a filter time constant $\tau_f$,
   D. controlled variable signal output means for selectively applying said manipulated variable signal to said process, and
   E. feedback means, coupled to said controlled variable signal output means, for processing said manipulated variable signal to generate said time-delayed integral signal, said processing including
      i) time-delaying said manipulated variable signal an amount substantially equal to a deadtime, $\tau_d$, and ii) passing that time-delayed manipulated variable signal through a first-order lag of time constant I to generate said time-delayed integral signal.

10. A proportional-integral-derivative deadtime process controller according to claim 9, wherein said noise filter means comprises
   A. means for sampling noise in said manipulated variable signal to generate a signal, $\sigma_m$, representative of a level thereof, and
   B. means for varying said filter time constant $\tau_f$ to maintain said noise at a selected level, $\sigma_{set}$.

11. A proportional-integral-derivative deadtime process controller according to claim 10, wherein said noise filter means includes means for generating said noise level signal, $\sigma_m$, for a time period substantially equal to said deadtime constant $\tau_d$.

12. A proportional-integral-derivative deadtime process controller according to claim 10, wherein said noise filter means comprises adaptation means for generating said filter time constant $\tau_f$ as a function of said deadtime constant $\tau_d$ and a ratio of said noise level $\sigma_m$ to said setpoint $\sigma_{set}$.

13. A proportional-integral-derivative deadtime process controller according to claim 12, wherein said noise filter means comprises means for generating said noise level signal, $\sigma_m$, as a function of (i) a sum of sampled values of said controller output and (ii) a sum of squares of those sampled values of said controller output.

14. A proportional-integral-derivative deadtime process controller according to claim 13, wherein said adaptation means includes means for generating said filter time constant $\tau_f$ as a function of a mathematical relation $$\tau_f = \tau_d/20 * \sigma_m/\sigma_{set}.$$

15. A proportional-integral-derivative deadtime process controller according to claim 14, wherein said adaptation means includes means for limiting said filter time constant $\tau_f$ to a selected range of values.

16. A proportional-integral-derivative deadtime process controller according to claim 15, wherein said adaptation means includes means for limiting said filter time constant $\tau_f$ to values substantially between 0 and $0.1 * \tau_d$.

17. A proportional-integral-derivative deadtime process controller according to claim 9, wherein said filter means is a second-order Butterworth filter.

18. A proportional-integral-derivative deadtime process controller according to claim 9, wherein said filter means is a first-order low-pass filter.

* * * * *